US008996611B2

(12) United States Patent
Nightingale et al.

(10) Patent No.: US 8,996,611 B2
(45) Date of Patent: Mar. 31, 2015

(54) PARALLEL SERIALIZATION OF REQUEST PROCESSING

(75) Inventors: Edmund B. Nightingale, Redmond, WA (US); Jeremy E. Elson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 220 days.

(21) Appl. No.: 13/017,193

(22) Filed: Jan. 31, 2011

(65) Prior Publication Data

US 2012/0197958 A1 Aug. 2, 2012

(51) Int. Cl.
*G06F 15/16* (2006.01)
*G06F 9/50* (2006.01)

(52) U.S. Cl.
CPC ...... *G06F 9/5027* (2013.01); *G06F 2209/5017* (2013.01)
USPC ........... 709/203; 709/212; 709/219; 709/226; 709/229; 709/248

(58) Field of Classification Search
USPC .......................... 709/201, 203, 212, 219, 229
See application file for complete search history.

(56) References Cited

U.S. PATENT DOCUMENTS

| 4,491,945 | A  | 1/1985  | Turner           |
|-----------|----|---------|------------------|
| 4,780,870 | A  | 10/1988 | McHarg et al.    |
| 5,305,320 | A  | 4/1994  | Andrews et al.   |
| 5,408,649 | A  | 4/1995  | Beshears et al.  |
| 5,423,046 | A  | 6/1995  | Nunnelley et al. |
| 5,553,285 | A  | 9/1996  | Krakauer et al.  |
| 5,621,884 | A  | 4/1997  | Beshears et al.  |
| 5,663,951 | A  | 9/1997  | Danneels et al.  |
| 5,914,878 | A  | 6/1999  | Yamamoto et al.  |
| 5,938,732 | A  | 8/1999  | Lim et al.       |
| 6,424,979 | B1 | 7/2002  | Livingston et al. |
| 6,577,613 | B1 | 6/2003  | Ramanathan       |
| 6,728,747 | B1 * | 4/2004 | Jenkins et al. ............... 718/101 |
| 6,850,489 | B1 | 2/2005  | Omi et al.       |
| 6,871,295 | B2 | 3/2005  | Ulrich et al.    |
| 6,963,996 | B2 | 11/2005 | Coughlin         |
| 7,076,555 | B1 | 7/2006  | Orman et al.     |

(Continued)

FOREIGN PATENT DOCUMENTS

| EP | 2192729 | 6/2010 |
| WO | WO2010108368 A1 | 9/2010 |

OTHER PUBLICATIONS

Sinnamohideen, A Transparently_Scalable Metadata Service for the Ursa Minor Storage System, presented at the Usenix Annual Technical Conference. Boston, MA, Jun. 23-25, 2010.*

(Continued)

*Primary Examiner* — Michael Y Won
(74) *Attorney, Agent, or Firm* — Heikki Einola; Micky Minhas

(57) ABSTRACT

A plurality of servers configured to receive a plurality of requests associated with a plurality of byte sequences are described herein. The requests for each byte sequence are received by a single one of the servers. Each server is further configured to serially process the requests it receives while the other servers also perform serial processing of requests in parallel with the server. Also, the requests for each byte sequence are transmitted to the single one of the servers by a plurality of clients, each client independently identifying the single one of the servers for the byte sequence based on system metadata.

20 Claims, 6 Drawing Sheets

(56) References Cited

U.S. PATENT DOCUMENTS

| | | | |
|---|---|---|---|
| 7,107,606 B2* | 9/2006 | Lee | 725/87 |
| 7,113,993 B1 | 9/2006 | Cappiello et al. | |
| 7,115,919 B2 | 10/2006 | Kodama | |
| 7,139,933 B2 | 11/2006 | Hsu et al. | |
| 7,165,256 B2* | 1/2007 | Boudnik et al. | 718/104 |
| 7,171,491 B1 | 1/2007 | O'Toole et al. | |
| 7,180,875 B1 | 2/2007 | Neumiller et al. | |
| 7,184,958 B2 | 2/2007 | Kagoshima et al. | |
| 7,231,475 B1 | 6/2007 | Singla et al. | |
| 7,240,358 B2 | 7/2007 | Horn et al. | |
| 7,342,876 B2 | 3/2008 | Bellur et al. | |
| 7,356,213 B1 | 4/2008 | Cunningham et al. | |
| 7,383,288 B2 | 6/2008 | Miloushev et al. | |
| 7,433,332 B2 | 10/2008 | Golden et al. | |
| 7,437,407 B2 | 10/2008 | Vahalia et al. | |
| 7,496,233 B2* | 2/2009 | Kirihara et al. | 382/229 |
| 7,577,817 B2 | 8/2009 | Karpoff et al. | |
| 7,610,348 B2 | 10/2009 | Kisley et al. | |
| 7,657,581 B2 | 2/2010 | Orenstein et al. | |
| 7,725,437 B2 | 5/2010 | Kirshenbaum et al. | |
| 7,756,826 B2 | 7/2010 | Bots et al. | |
| 7,769,843 B2 | 8/2010 | Neuse et al. | |
| 7,774,469 B2 | 8/2010 | Massa et al. | |
| 7,779,148 B2 | 8/2010 | Arimilli et al. | |
| 7,801,994 B2 | 9/2010 | Kudo | |
| 7,805,580 B2 | 9/2010 | Hirzel et al. | |
| 7,817,880 B1 | 10/2010 | Drost et al. | |
| 7,840,136 B1 | 11/2010 | Cunningham et al. | |
| 7,916,703 B2 | 3/2011 | Yang et al. | |
| 8,010,829 B1 | 8/2011 | Chatterjee et al. | |
| 8,037,478 B2* | 10/2011 | Tanaka et al. | 719/312 |
| 8,041,760 B2 | 10/2011 | Mamou et al. | |
| 8,074,107 B2 | 12/2011 | Sivasubramanian et al. | |
| 8,160,063 B2 | 4/2012 | Maltz et al. | |
| 8,181,061 B2 | 5/2012 | Nightingale et al. | |
| 8,195,950 B2 | 6/2012 | Spearman | |
| 8,234,518 B2 | 7/2012 | Hansen | |
| 8,261,033 B1 | 9/2012 | Slik et al. | |
| 8,266,136 B1 | 9/2012 | Pogde et al. | |
| 8,274,987 B2 | 9/2012 | Jia | |
| 8,296,398 B2 | 10/2012 | Lacapra et al. | |
| 8,296,408 B2 | 10/2012 | Anke et al. | |
| 2002/0083134 A1* | 6/2002 | Bauer et al. | 709/204 |
| 2002/0093948 A1 | 7/2002 | Dertz et al. | |
| 2002/0152293 A1 | 10/2002 | Hahn et al. | |
| 2002/0194245 A1* | 12/2002 | Simpson et al. | 709/101 |
| 2004/0153479 A1 | 8/2004 | Mikesell et al. | |
| 2005/0075911 A1 | 4/2005 | Craven, Jr. | |
| 2005/0078655 A1 | 4/2005 | Tiller et al. | |
| 2005/0094640 A1 | 5/2005 | Howe | |
| 2005/0111423 A1 | 5/2005 | Anderson et al. | |
| 2005/0138186 A1 | 6/2005 | Hesselink et al. | |
| 2005/0262097 A1 | 11/2005 | Sim-Tang et al. | |
| 2006/0004759 A1 | 1/2006 | Borthakur et al. | |
| 2006/0015495 A1 | 1/2006 | Keating et al. | |
| 2006/0074946 A1 | 4/2006 | Pham | |
| 2006/0098572 A1 | 5/2006 | Zhang et al. | |
| 2006/0129614 A1 | 6/2006 | Kim et al. | |
| 2006/0159456 A1 | 7/2006 | Gumaste et al. | |
| 2006/0280168 A1 | 12/2006 | Ozaki | |
| 2007/0025381 A1 | 2/2007 | Feng et al. | |
| 2007/0036093 A1 | 2/2007 | Newberg et al. | |
| 2007/0043824 A1 | 2/2007 | Fremantle | |
| 2007/0147322 A1 | 6/2007 | Agrawal et al. | |
| 2007/0153755 A1 | 7/2007 | Yang et al. | |
| 2007/0156842 A1* | 7/2007 | Vermeulen et al. | 709/217 |
| 2007/0158432 A1* | 7/2007 | Tadamasa | 235/480 |
| 2007/0230493 A1 | 10/2007 | Dravida et al. | |
| 2007/0266208 A1 | 11/2007 | Kim et al. | |
| 2007/0266244 A1 | 11/2007 | Walker et al. | |
| 2008/0005275 A1 | 1/2008 | Overton et al. | |
| 2008/0010400 A1 | 1/2008 | Moon | |
| 2008/0098392 A1 | 4/2008 | Wipfel et al. | |
| 2008/0114827 A1* | 5/2008 | Gerber et al. | 709/201 |
| 2008/0162622 A1* | 7/2008 | Becker et al. | 709/201 |
| 2008/0215727 A1 | 9/2008 | Denis et al. | |
| 2009/0006888 A1 | 1/2009 | Bernhard et al. | |
| 2009/0097443 A1 | 4/2009 | Pasanen et al. | |
| 2009/0106269 A1* | 4/2009 | Zuckerman et al. | 707/10 |
| 2009/0112921 A1 | 4/2009 | Oliveira et al. | |
| 2009/0113323 A1 | 4/2009 | Zhao et al. | |
| 2009/0144422 A1 | 6/2009 | Chatley et al. | |
| 2009/0183002 A1 | 7/2009 | Rohrer et al. | |
| 2009/0198958 A1 | 8/2009 | Arimilli et al. | |
| 2009/0201923 A1 | 8/2009 | Menon et al. | |
| 2009/0204405 A1 | 8/2009 | Kato et al. | |
| 2009/0213731 A1 | 8/2009 | Bhasin et al. | |
| 2009/0249418 A1 | 10/2009 | Alastruey Gracia et al. | |
| 2009/0259665 A1 | 10/2009 | Howe et al. | |
| 2009/0265218 A1 | 10/2009 | Amini et al. | |
| 2009/0268611 A1 | 10/2009 | Persson et al. | |
| 2009/0271412 A1 | 10/2009 | Lacapra et al. | |
| 2009/0300407 A1 | 12/2009 | Kamath et al. | |
| 2009/0307329 A1 | 12/2009 | Olston et al. | |
| 2010/0008230 A1 | 1/2010 | Khandekar et al. | |
| 2010/0008347 A1 | 1/2010 | Qin et al. | |
| 2010/0061366 A1 | 3/2010 | DelRegno et al. | |
| 2010/0094955 A1 | 4/2010 | Zuckerman et al. | |
| 2010/0094956 A1 | 4/2010 | Zuckerman et al. | |
| 2010/0153639 A1 | 6/2010 | Corry et al. | |
| 2010/0161657 A1* | 6/2010 | Cha et al. | 707/770 |
| 2010/0191919 A1 | 7/2010 | Bernstein et al. | |
| 2010/0198888 A1 | 8/2010 | Blomstedt et al. | |
| 2010/0198972 A1 | 8/2010 | Umbehocker | |
| 2010/0228835 A1* | 9/2010 | Pitts | 709/219 |
| 2010/0250746 A1 | 9/2010 | Murase | |
| 2010/0277345 A1 | 11/2010 | Rodriguez et al. | |
| 2010/0332454 A1 | 12/2010 | Prahlad et al. | |
| 2010/0332818 A1 | 12/2010 | Prahlad et al. | |
| 2011/0022574 A1 | 1/2011 | Hansen | |
| 2011/0075628 A1 | 3/2011 | Cho et al. | |
| 2011/0083154 A1 | 4/2011 | Boersma | |
| 2011/0099126 A1 | 4/2011 | Belani et al. | |
| 2011/0145442 A1 | 6/2011 | Diab | |
| 2011/0153835 A1 | 6/2011 | Rimac et al. | |
| 2011/0205974 A1 | 8/2011 | Zhu et al. | |
| 2011/0228789 A1 | 9/2011 | Jia | |
| 2011/0246471 A1 | 10/2011 | Rakib | |
| 2011/0246735 A1 | 10/2011 | Bryant et al. | |
| 2011/0258290 A1 | 10/2011 | Nightingale et al. | |
| 2011/0258297 A1 | 10/2011 | Nightingale et al. | |
| 2011/0258482 A1 | 10/2011 | Nightingale et al. | |
| 2011/0258488 A1 | 10/2011 | Nightingale et al. | |
| 2011/0283019 A1* | 11/2011 | Bennett et al. | 709/246 |
| 2011/0292949 A1 | 12/2011 | Hayashi et al. | |
| 2011/0296025 A1 | 12/2011 | Lieblich et al. | |
| 2011/0307886 A1 | 12/2011 | Thanga et al. | |
| 2012/0041976 A1 | 2/2012 | Annapragada | |
| 2012/0042162 A1 | 2/2012 | Anglin et al. | |
| 2012/0047239 A1 | 2/2012 | Donahue et al. | |
| 2012/0054556 A1 | 3/2012 | Grube et al. | |
| 2012/0158948 A1 | 6/2012 | Pang et al. | |
| 2012/0197958 A1 | 8/2012 | Nightingale et al. | |
| 2012/0207036 A1 | 8/2012 | Ong et al. | |
| 2012/0224481 A1 | 9/2012 | Babiarz et al. | |
| 2012/0256735 A1 | 10/2012 | Gilson | |
| 2012/0278400 A1 | 11/2012 | Elson et al. | |

OTHER PUBLICATIONS

Kennedy, Is Parallel Computing Dead? http://www.crpc.rice.edu/newsletters/oct94/director.html published in the Parallel Computing Research Newsletter vol. 2, Issue 4, Oct. 1994.*

Sinnamohideen, A Transparently-Scalable Metadata Service for the Ursa Minor Storage System, Jun. 23, 2010, Usenix Annual Technical Conference.*

Sinnamohideen et al. A Tranparntly-Scalable Metadata Serivce for the Ursa Minor Storage System, presented at the Unix Annual Technical Conference, Boston, MA, Jun. 23-25, 2010.*

U.S. Appl. No. 12/410,697, "Data Center Without Structural Bottlenecks," Maltz et al, filed Mar. 25, 2009.

U.S. Appl. No. 12/410,745, "Data Center Interconnect and Traffic Engineering," Maltz et al, filed Mar. 25, 2009.

(56) References Cited

OTHER PUBLICATIONS

U.S. Appl. No. 12/578,608, "Agile Data Center Network Architecture," Greenberg et al, filed Oct. 14, 2009.
Akturk, "Asynchronous Replication of Metadata Across Multi-Master Servers in Distributed Data Storage Systems", A Thesis Submitted to Louisiana State University and Agricultural and Mechanical College, Dec. 2009, 70 pages.
Buddhikot et al, "Design of a Large Scale Multimedia Storage Server," Journal Computer Networks and ISDN Systems, vol. 27, Issue 3, Dec. 1994, pp. 1-18.
"Citrix Storage Delivery Services Adapter for NetApp Data ONTAP", retrieved on Mar. 9, 2010 at <<http://citrix.com/site/resources/dynamic/partnerDocs/datasheet_adapter.pdf>>, Citrix Systems, Citrix Storage Delivery Services Data sheet, 2008, 2 pgs.
"EMC RecoverPoint Family: Cost-effective local and remote data protection and disaster recovery solution", retrieved on Mar. 9, 2010 at <<http://www.emc.com/collateral/software/data-sheet/h2769-emc-recoverpoint-family.pdf>>, EMC Corporation, Data Sheet H2769.8, 2010, 3 pgs.
Fu, et al., "A Novel Dynamic Metadata Management Scheme for Large Distributed Storage Systems", Proceedings of the 2008 10th IEEE International Conference on High Performance Computing and Communications, Sep. 2008, pp. 987-992.
Fullmer et al, "Solutions to Hidden Terminal Problems in Wireless Networks," Proceedings of the ACM SIGCOMM '97 Conference on Applications, Technologies, Architectures, and Protocols for Computer Communication, Cannes, France, Oct. 1997, pp. 39-49.
Lang, "Parallel Virtual File System, Version 2", retrieved on Nov. 12, 2010 from <<http://www.pvfs.org/cvs/pvfs-2-7-branch.build/doc/pvfs2-guide/pvfs2-guide.php>>, Sep. 2003, 39 pages.
Mohamed et al, "Extensible Communication Architecture for Grid Nodes," abstract retrieved on Apr. 23, 2010 at <<http://www.computer.org/portal/web/csdl/doi/10.1109/itcc.2004.1286587>>, International Conference on Information Technology: Coding and Computing (ITCC'04), vol. 2, Apr. 5-7, 2004, Las Vegas, NV, 1 pg.
Weil et al, "CRUSH: Controlled, Scalable, Decentralized Placement of Replicated Data," Proceedings of SC '06, Nov. 2006, 12 pgs.
Weiser, "Some Computer Science Issues in Ubiquitous Computing," retrieved at <<https://www.cs.ucsb.edu/~ravenben/papers/coreos/Wei93.pdf>>, Mar. 1993, 14 pgs.
Non-Final Office Action for U.S. Appl. No. 12/763,133, mailed on Sep. 16, 2011, Edmund Nightingale, "Memory Management and Recovery for Datacenters", 18 pages.
Bafna et al, "CHIRAYU: A Highly Available Metadata Server for Object Based Storage Cluster File System," retrieved from <<http://abhinaykampasi.tripod.com/TechDocs/ChirayuPaper.pdf>>, IEEE Bombay Section, Year 2003 Prof K Shankar Student Paper & Project Contest, Apr. 2003, 6 pgs.
Chen et al, "Replication-Based Highly Available Metadata Management for Cluster File Systems," 2010 IEEE International Conference on Cluster Computing, Sep. 2010, pp. 292-301.
Fan et al, "A Failure Recovery Mechanism for Distributed Metadata Servers in DCFS2," Seventh International Conference on High Performance Computing and Grid in Asia Pacific Region, Jul. 20-22, 2004, 7 pgs.
Sinnamohideen et al, "A Transparently-Scalable Metadata Service for the Ursa Minor Storage System," USENIX ATC'10 Proceedings of the 2010 USENIX Conference, Jun. 2010, 14 pgs.
Isard, et al., "Dryad: Distributed Data-Parallel Programs from Sequential Building Blocks", In Proceedings of the 2nd ACM SIGOPS/EuroSys European Conference on Computer Systems, Mar. 21, 2007, 14 pages.
Office action for U.S. Appl. No. 13/412,944, mailed on Oct. 11, 2012, Nightingale et al., "Reading and Writing During Cluster Growth Phase", 9 pages.
Office action for U.S. Appl. No. 13/112,978, mailed on Dec. 14, 2012, Elson et al., "Data Layout for Recovery and Durability", 13 pages.
Office action for U.S. Appl. No. 13/116,270, mailed on Feb. 15, 2013, Nightingale et al., "Server Failure Recovery", 16 pages.
The PCT Search Report mailed Oct. 23, 2012 for PCT application No. PCT/US2012/035700, 10 pages.
Rhea et al., "Maintenance-Free Global Data Storage", IEEE Internet Computing, Sep.-Oct. 2001, 10 pages.
U.S. Appl. No. 13/598,990, "Block Level Access to Parallel Storage", Fan et al, filed Aug. 30, 2012.
Baratto et al., "THINC: A Remote Display Architecture for Thin-Client Computing", In Technical Report CUCS-027-04, Jul. 2004, 15 pages.
Bonwick et al., "ZFS: The Last Word in File Systems", retrieved at <<wiki.illumos.org/download/attachments/1146951zfs_last.pdf>>, Sun microsystems, Sep. 2008, 44 pages.
Borthakur, "The Hadoop Distributed File System: Architecture and Design", retrieved at <<http://hadoop.apache.org/docs/stable/hdfs_design.html>>, The Apache Software Foundation, Mar. 2013, 8 pages.
Braam, "The Lustre Storage Architecture", Cluster File Systems, Inc., Aug. 2004, 439 pages.
Carnes rt al., "PVFS: A Parallel File System for Linux Clusters", In Proceedings of the Extreme Linux Track: 4th Annual Linux Showcase and Conference, Oct. 2000, 11 pages.
"Citrix Xen-Desktop Virtualization Desktop Infrastructure", retrieved on Jun. 11, 2013 at <<http://www.citrix.com/solutions/desktop-virtualization/overview.html>> Citrix Systems, Inc., 2 pages.
Norton et al., "Common Internet File System (CIFS) Technical Reference", Storage Networking Industry Association, Mar. 2002, 150 pages.
Feller, Virtual Desktop Resource Allocation, retrieved at <<http://blogs.citrix.com/2010/11/12/virtual-desktop-resource-allocation>>, Citrix Systems, Inc., Nov. 2010, 2 pages.
Fellows, "Storage Optimization for VDI", Storage Networking Industry Association, 2011, 42 pages.
Ghemawat et al., "The Google File System", In Proceedings of the Nineteenth ACM Symposium on Operating Systems Principles, Oct. 2003, 15 pages.
Greenberg et al., "Towards a Next Generation Data Center Architecture: Scalability and Commoditization", In Proceedings of the ACM Workshop on Programmable Routers for Extensible Service of Tomorrow, Aug. 2008, pp. 57-62.
Hartman et al., "The Zebra Striped Network File System" In Proceedings of the Fourteenth ACM Symposium on Operating Systems Principles, Dec. 1993, pp. 29-43.
Hitz et al., "File System Design for an NFS File Server Appliance" USENIX Winter 1994 Conference, Jan. 1994, 23 pages.
Hopkins et al., "AoE (ATA over Ethernet)", The Brantley Coile Company, Inc., Feb. 2009, 14 pages.
TechNet, "How Dynamic Disks and Volumes Work", available at <<http://technet.microsoft.com/en-us/library/cc758035>>, Microsoft, last updated Mar. 2003, 19 pages.
Howard et al., "Scale and Performance in a Distributed File System", Journal of ACM Transactions on Computer Systems, vol. 6, Issue 1, Feb. 1988, pp. 51-81.
Hsiao et al., "Chained Declustering: A New Availability Strategy for Multiprocessor Database Machines", Sixth Annual Conference on Data Engineering, Feb. 1990, 10 pages.
TechNet, "Jetstress Field Guide", retrieved at <<http://gallery.technet.microsoft.com/Jetstress-Field-Guide-1602d64c>>, Microsoft, Inc., Nov. 2010, 1 page.
Kistler et al., "Disconnected Operation in the Coda File System", ACM Transactions on Computer Systems, vol. 10, No. 1, Feb. 1992, pp. 3-25.
Krioukov et al., "Parity Lost and Parity Regained", The Proceedings of the 6th USENIX Conference on File and Storage Technologies, Feb. 2008, pp. 127-141.
Lee et al., "Petal: Distributed Virtual Disks", In The Proceedings of the 7th International Conference on Architectural Support for Porgramming Languages and Operating Systems, vol. 31, No. 9, Sep. 1996, 9 pages.
Lim et al., "Voluntary Disconnected Operations for Energy Efficient Mobile Devices in Pervasive Computing Environments", In Intelligent Automation & Soft Computing, vol. 19, Issue 1, Mar. 2013, pp. 1-12.

(56) References Cited

OTHER PUBLICATIONS

Menon et al., "IBM Storage Tank—A heterogeneous scalable SAN file system", IBM Systems Journal, vol. 42, No. 2, Nov. 2003, pp. 250-267.

Nightingale et al., "Flat Datacenter Storage", 10th USENIX Symposium on Operating Systems Design and Implementation, Oct. 18, 2012, 15 pages.

Nightingale et al., "Rethink the Sync", 7th USENIX Symposium on Operating Systems Design and Implementation, Nov. 2006, 14 pages.

Office action for U.S. Appl. No. 13/112,978, mailed on Jan. 16, 2014, Elson, et al., "Data Layout for Recovery and Durability", 18 pages.

Office action for U.S. Appl. No. 13/116,270, mailed on Aug. 27, 2013, Nightingale, et al., "Server Failure Recovery", 18 pages.

Office action for U.S. Appl. No. 13/096,194, mailed on Sep. 23, 2013, Elson, et al., "Effective Circuits in Packet-Switched Networks", 26 pages.

Non-Final Office Action for U.S. Appl. No. 13/112,978, mailed on Jul. 17, 2013, Elson et al., "Data Layout for Recovery and Durability", 15 pages.

Pawlowski et al., "NFS Version 3 Design and Implementation", Summer USENIX Conference, Jun. 1994, 15 pages.

Rodeh et al., "zFS—A Scalable Distributed File System Using Object Disks", 20th IEEE/11th NASA Goddard Conference on Mass Storage Systems and Technologies, Apr. 2003, 12 pages.

Satran et al., "Internet Small Computer Systems Interface (iSCSI)", Technical Report, RFC3720, IBM, Apr. 2004, 155 pages.

Schmuck et al., "GPFS: A Shared-Disk File System for Large Computing Clusters", In Proceedings of the Conference on File and Storage Technologies (FAST'02), Jan. 2002, pp. 231-244.

Shepler et al., "Network File System (NFS) Version 4 Minor Version 1 Protocol", Technical Report, RFC 5661, Internet Engineering Task Force, Jan. 2010, 618 pages.

Terry et al, "Managing Update Conflicts in Bayou, a Weakly Connected Replicated Storage System", in Proceedings of the 15th ACM Symposoim on Operating System Principles, Dec. 1995, pp. 172-183.

Verbowski et al., "Flight Data Recorder: Monitoring Persistent-State Interactions to Improve Systems Management", in Proceedings of the 7th USENIX Symposium on Operating Systems Design and Implementation, Nov. 2006, pp. 117-130.

"VMware View—Your Cloud, Your Desktop, Just Got Better", retrieved Jun. 2013 at <<www.vmware.com/files/pdf/view/VMware-View-Datasheet.pdf>>, VMware, Inc., 4 pages.

Vrable et al., "BlueSky: A Cloud-Backed File System for the Enterprise", Proceedings of the 10th USENIX Conference on File and Storage, Feb. 2013, 14 pages.

Vrable et al., "Cumulus: Filesystem Backup to the Cloud", In 7th USENIX Conference on File Storage Technologies, Published Feb. 24, 2009, pp. 1-14.

Vrable, "Migrating Enterprise Storage Applications to the Cloud", In Doctoral Dissertation, University of California, Published 2011, pp. 1-112.

Weil et al., "Ceph: A Scalable, High-Performance Distributed File System" in Proceedings of the 7th USENIX Symposium on Operating Systems Design and Implementation, Nov. 2006, pp. 307-320.

Weinsberg et al., "A Programming Model and System Support for Disconnected-Aware Applications on Resource-Constrained Devices", in Proceedings of the 24th International Conference on Software Engineering, May 2002, pp. 374-384.

Welch et al., "Scalable Performance of the Panasas Parallel File System" in Proceedings of the 8th USENIX Conference on File and Storage Technologies, Feb. 2008, pp. 17-33.

TechNet, "Windows PE Technical Reference", available at <<http://technet.microsoft.com/en-us/library/dd744322>>, Microsoft, Oct. 2009, 2 pages.

Office action for U.S. Appl. No. 13/096,194, mailed on Feb. 7, 2014, Elson, et al., "Effective Circuits in Packet-Switched Networks", 23 pages.

Office Action for U.S. Appl. No. 12/766,726, mailed on May 29, 2012, Nightingale et al., "Bandwidth-Proportioned Datacenters", 21 pages.

Office Action for U.S. Appl. No. 12/763,107, mailed on Jul. 20, 2012, Nightingale et al., "Locator Table and Client Library for Datacenters", 11 pages.

The European Office Action mailed May 23, 2014 for European patent application No. 12776594.9, a counterpart foreign application of U.S. Appl. No. 13/096,194, 6 pages.

The European Office Action mailed Oct. 6, 2014 for European patent application No. 12776594.9, a counterpart foreign application of U.S. Appl. No. 13/096,194, 6 pages.

The Supplementary European Search Report mailed May 13, 2014 for European Patent Application No. 12776594.9, 4 pages.

Office action for U.S. Appl. 13/112,978 mailed on May 22, 2014, Elson et al., "Data Layout for Recovery and Durability", 11 pages.

Office Action for U.S. Appl. No. 13/116,270, mailed on Aug. 14, 2014, Edmund B. Nightingale, "Server Failure Recovery", 15 pages.

* cited by examiner

PARALLEL SERIALIZATION OF REQUEST PROCESSING

BACKGROUND

Large-scale network-based services often require large-scale data storage. For example, Internet email services store large quantities of user inboxes, each user inbox itself including a sizable quantity of data. This large-scale data storage is often implemented in datacenters comprised of storage and computation devices. The storage devices are typically arranged in a cluster and include redundant copies. This redundancy is often achieved through use of a redundant array of inexpensive disks (RAID) configuration and helps minimize the risk of data loss. The computation devices are likewise typically arranged in a cluster.

In operation, clients accessing these large-scale services often need to interact with objects distributed across the data storage. For example, the clients may seek to create, extend, delete, read from, or write to byte sequences, such as binary large objects. Some of these operations, such as create, extend, and delete requests related to a same byte sequence, require coordination among multiple clients. For example, because a byte sequence can only be created once, only a single one of multiple create requests issued by clients for that byte sequence should succeed.

In order to coordinate these requests between the multiple clients, large-scale services typically utilize a central server that receives all requests requiring coordination and processes those requests serially. The central server also stores metadata for all of the byte sequences to enable the central server to, for example, determine if a byte sequence has already been created and determine a current size of the byte sequence. While utilization of the central server achieves coordination of the client requests and avoids the inconsistencies that would arise without coordination, it also introduces performance bottlenecks, as all of the clients must interact with the same central server and wait for it to serially respond to their requests.

SUMMARY

Described herein is a plurality of servers configured to act in parallel to serially process requests received from clients. Each server processes requests associated with one or more byte sequences, and requests associated with a given byte sequence are processed by a single one of the servers. The serial processing of requests for a given byte sequence at a single server ensures consistency and coordination, while the use of multiple servers in parallel avoids the performance bottlenecks associated with a central server.

Clients determine which of the servers to send their requests to based on shared system metadata that associates metadata for each byte sequence with one of the servers and, optionally, one or more replica servers. The server associated with the metadata for the byte sequence is responsible for serially processing the requests for that byte sequence which require coordination between multiple clients. Upon identifying the servers, the clients send their requests to the servers for the servers to act in parallel to serially process the requests.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Overview

Figure 1:
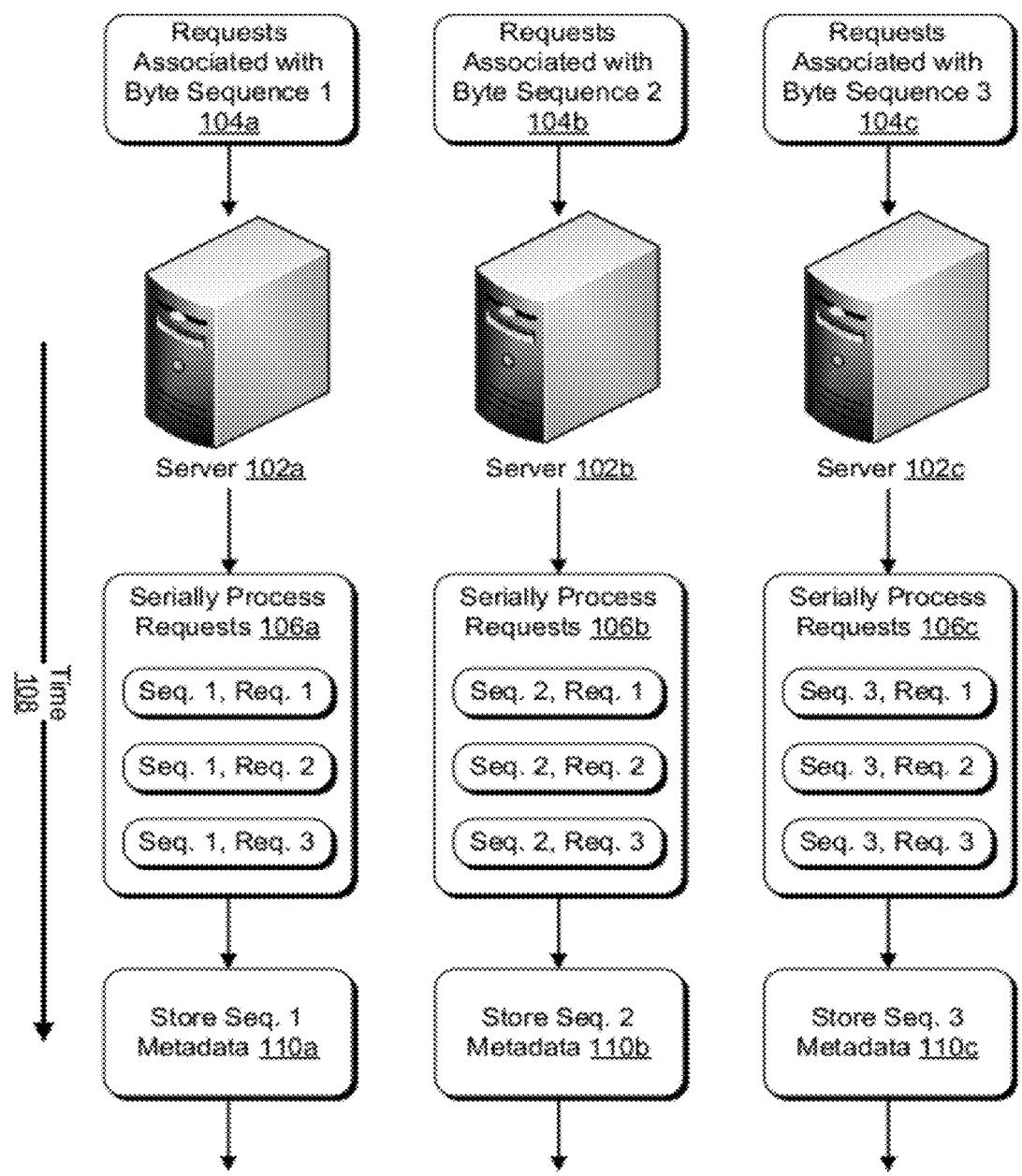
FIG. 1 illustrates an overview of multiple servers operating in parallel, each server processing a number of requests serially, in accordance with various embodiments.

FIG. 1 illustrates an overview of multiple servers operating in parallel, each server processing a number of requests serially, in accordance with various embodiments. As illustrated, a plurality of servers 102, including a server 102a, a server 102b, and a server 102c act in parallel to serially process requests requiring coordination between multiple clients.

In various implementations, the servers 102 receive requests 104 associated with a plurality of byte sequences. Server 102a receives requests 104a associated with byte sequence 1. Server 102b receives requests 104b associated with byte sequence 2. Server 102c receives requests 104c associated with byte sequence 3. The servers 102 may also receive requests 104 associated with additional byte sequences (e.g., server 102a may receive requests 104 associated with a byte sequence 8), but all requests 104 associated with a given byte sequence that require coordination between multiple clients are received by a same one of the servers 102. For example, if there is a byte sequence 5, all requests 104 associated with byte sequence 5 that require coordination would be received by a single one of the servers 102.

The servers 102 may receive these requests 104 from multiple clients. The clients may identify which servers 102 to send given requests 104 to based on shared system metadata. For example, as described further below, clients may utilize a locator table to identify which server 102 stores metadata for given byte sequence. In some implementations, the clients may also utilize the locator table in a similar manner to identify replicas of the server 102 storing the metadata. These replicas may also be servers 102. Example requests requiring coordination include create requests for creating byte sequences, extend requests for extending byte sequences, or delete requests for deleting byte sequences.

In various implementations, the servers 102 then serially process 106 the requests 104, performing the serial processing 106 in parallel with respect to each other. As shown by the time axis 108 in FIG. 1, requests 104 are serially processed 106 over time at each server 102, one request 104 after another. At any given time on the time axis 108, though, multiple requests 104 are respectively processed 106 at multiple servers 102. For example, server 102a serially processes 106a three requests 104a associated with byte sequence 1 in order. The order in which the requests 104 are serially processed 106 may be the order in which they are received or may be based on any other scheme for prioritizing one request 104 over another. Also, server 102b serially processes 106b two requests 104b associated with byte sequence 2, one after another, and server 102c serially processes 106c three requests 104c associated with byte sequence 3, one after another. As shown, request 1 at each of the servers 102 is processed 106 at approximately the same time with reference to time axis 108, as is request 2.

In some implementations, serially processing 106 a request 104 involves a two-phase commit process. Such a two-phase commit process may involve each server 102 communicating with its replicas to ensure that metadata state and data state is mirrored between the servers 102 and replicas with regard to a byte sequence. Further details of the use of a two-phase commit process in serially processing 106 a request 104 are described below.

The serial processing 106 may also involve performing specific operations associated with specific request types (e.g., specific operations for create requests, extend requests, delete requests, etc.). Further details of those specific operations are discussed below.

In various implementations, at the conclusion of serially processing 106 requests 104, the servers 102 store 110 metadata for the byte sequences associated with the requests 104 on the servers 102. For example, the server 102a stores 110a metadata associated with byte sequence 1, the server 102b stores 110b metadata associated with byte sequence 2, and the server 102c stores 110c metadata associated with byte sequence 3. After performing the storing 110, the servers 102 respond to the requests 104 by indicating success or failure or by providing other information associated with the type of the request 104.

In some implementations, while serially processing 106 the requests 104, servers 102 can concurrently receive and process requests which do not require coordination and which are thus processed independently of the serial processing 106, such as read or write requests. These read or write requests may be associated with a plurality of tracts of a plurality of byte sequences that may be different from the byte sequences for which each server 102 is serially processing 106 requests 104. As used herein, "tracts" refer to the units comprising byte sequences. The tracts each have a predetermined same size, such as eight megabytes, and represent the smallest unit of data that can be read from or written to a storage unit that maximizes performance. For example, on a mechanical device, such as a disk, the "tract" size would be large enough to avoid giving up performance due to the lost opportunity of reading more data "for free" after a seek or rotational delay. As a second example, on a medium such as flash, the "tract" size would be calculated based on the chip bandwidth and characteristics of the flash storage medium.

Example Architecture

Figure 2:
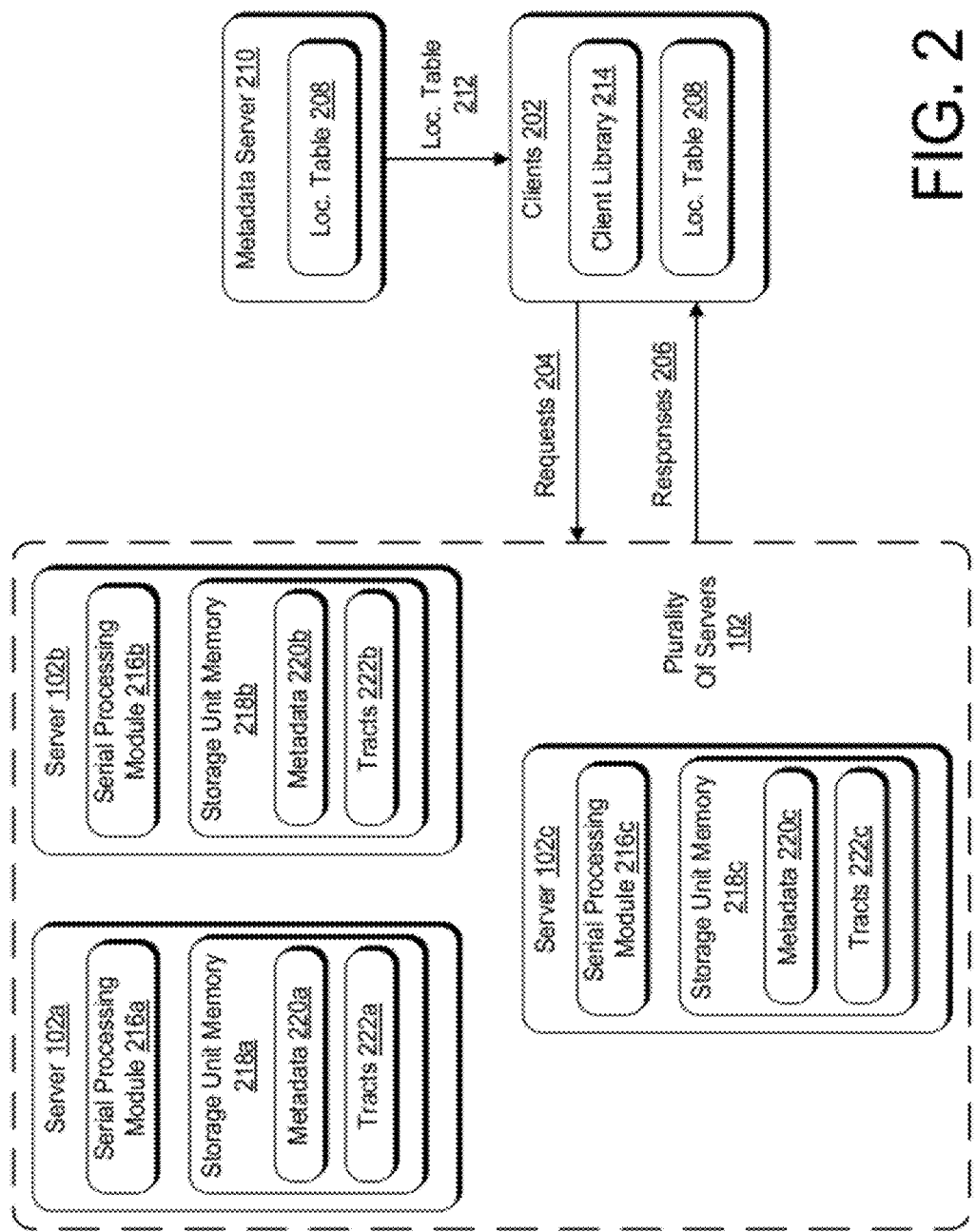
FIG. 2 illustrates a block diagram showing an example architecture of servers, a client, and a metadata server, in accordance with various embodiments.

FIG. 2 illustrates a block diagram showing an example architecture of servers, a client, and a metadata server, in accordance with various embodiments. In various implementations, these servers, client, and metadata server may comprise datacenters for data storage and input/output operations. For example, a system illustrated by FIG. 2 could be a datacenter for a word processing service or a search engine. Each document of a word processing service could correspond to a byte sequence. To make full use of the bandwidth of storage nodes implementing the servers, the tracts of a byte sequence are distributed across the servers, thus enabling the client to read from and write to multiple servers simultaneously when reading from or writing to a byte sequence.

As illustrated in FIG. 2, each client 202 transmits requests 204 to servers 102 and receives responses 206 in return. The clients 202 determines which server(s) 102 to transmit the requests 204 to based at least in part on a locator table 208. The locator table 208 comprises shared system metadata that is generated and maintained by a metadata server 210. The clients 202 receive or retrieve 212 the locator table 208 from the metadata server 210. Additionally, each client 202 includes a client library 214 that enables the client 202 to perform the requesting 204, receiving responses 206, and receiving/retrieving 212 the locator table 208. The servers 102, as shown, comprise serial processing modules 216 to enable the servers 102 to serially process requests 204 that require coordination between multiple clients 202. The servers 102 also include storage unit memory 218 to store byte sequence metadata 220 and tracts 222 of multiple byte sequences.

Figure 6:
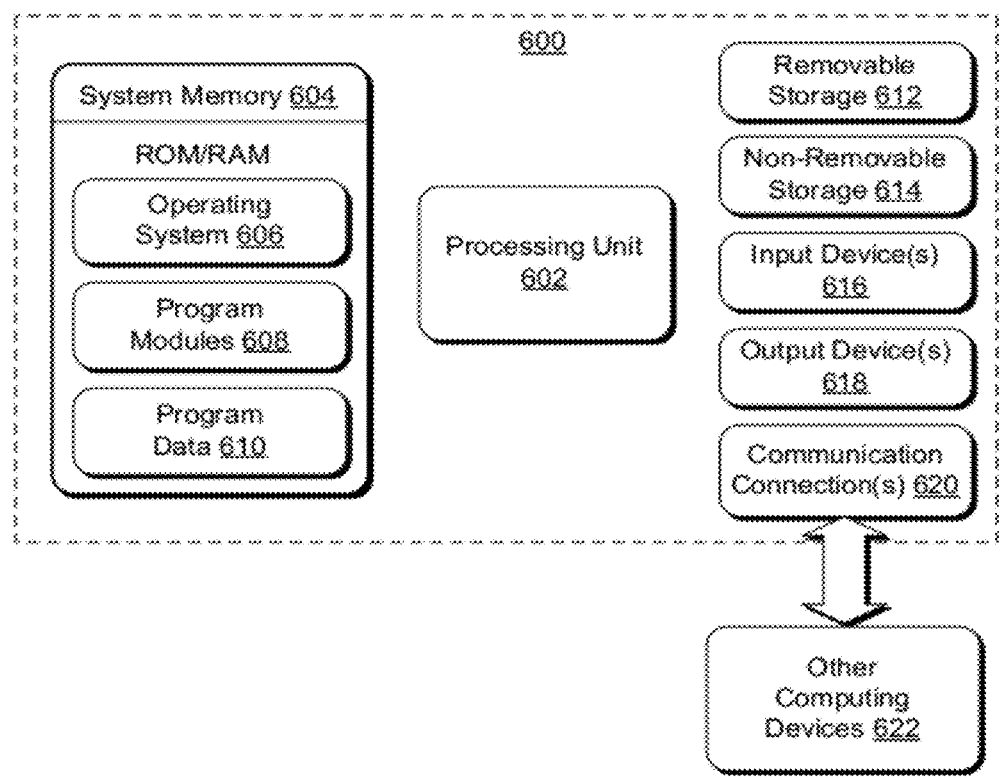
FIG. 6 illustrates a block diagram showing components of a computer system implementing a server, client, or metadata server, in accordance with various embodiments.

In various implementations, each of the servers 102, the clients 202, and the metadata server 210 is implemented in a separate computing device. The computing device may be any sort of computing device, such as a personal computer (PC), a laptop computer, a workstation, a server system, a mainframe, or any other computing device. In one embodiment, one of the servers 102, clients 202, and metadata server 210 is a virtual machine located on a computing device with other systems. In some embodiments, rather than implementing each server 102, client 202, and metadata server 210 on a separate computing device, two or more of the server 102, client 202, and metadata server 210 are implemented on a shared computing device, as separate virtual machines or otherwise. For example, a server 102 and metadata server 210 could be implemented on a single computing device. Also, multiple ones of the servers 102 may be implemented on a single computing device, with one server 102 for each storage unit memory 218 of the computing device. Thus, if a single computing device includes both storage unit memory 218a and storage unit memory 218b, that computing device would implement both server 102a and server 102b. Example computing devices implementing the servers 102, clients 202, and metadata server 210 are illustrated in FIG. 6 and are described in greater detail below with reference to that figure.

In some implementations, the computing devices implementing the servers 102, clients 202, and metadata server 210 are connected by one or more switches (not shown). These switches can also comprise one or more networks, such as wide area networks (WANs), local area networks (LANs), or personal area networks (PANs). The network may also be a private network such as a network specific to a datacenter. In such an implementation, the switches comprise or are connected to routers and/or devices acting as bridges between data networks. Communications between the computing devices through the switches and routers may utilize any sort of communication protocol known in the art for sending and receiving messages, such as the Transmission Control Protocol/Internet Protocol (TCP/IP) and/or the User Datagram Protocol (UDP).

As illustrated in FIG. 2, each client 202 has a locator table 208 and a client library 214. Each client 202 may also have an operating system (OS), applications, and a file system interface enabling the OS or applications to communicate with the client library 214. The applications or OS may initiate the requests 204.

The applications may be any sort of application, such as a word processing service or a process, thread, or routine of such a service. Such applications may make requests related to a file rather than a byte sequence and may have those requests translated to requests associated with a byte sequence by a file system interface. The file system interface maps or translates the request for a file into a request for a byte sequence. To do so, the file system interface may make use of a table or other structure storing a mapping of a file name to a byte sequence identifier, such as a byte sequence GUID. As used herein, the term "byte sequence" refers to a binary large object (also known as a "blob") or other grouping of data. Each byte sequence is comprised of one or more "tracts." As described above, each tract represents a location within the byte sequence corresponding to a sequence number or offset and has a same length. For example, the same length may be a length of eight megabytes, sixty-four kilobytes, or some length in-between. Also, as used herein, "byte sequence identifier" refers to a globally unique identifier (GUID) and may have a one-hundred-twenty-eight bit length, a one-hundred-sixty bit length, or some other length. Each tract within a byte sequence may also correspond to a tract identifier, the tract identifier being a combination of a byte sequence identifier and a tract sequence number indicating the place of the tract within the sequence. When the sequence number is combined with the tract size, a byte offset can be calculated for the tract. For example, if the byte sequence identifier has a one-hundred-twenty-eight bit length, the tract sequence number may be represented by sixty-four bits, creating a one-hundred-ninety-two bit length tract identifier.

In other embodiments, the file system interface requests a byte sequence identifier from a central store, the central store located on the computing device implementing the client 202 or on some other computing device. In other embodiments, the client 202 does not include a file system interface and its applications are configured to request a byte sequence rather than a file.

Figure 3:
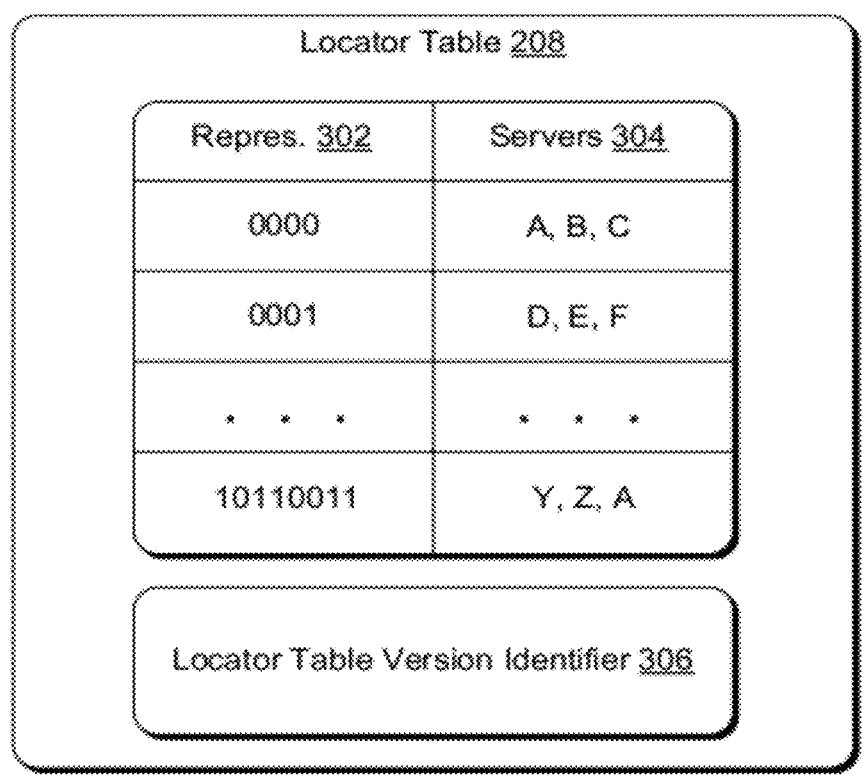
FIG. 3 illustrates a block diagram showing an example locator table, in accordance with various embodiments.

In various embodiments, as mentioned above, each client 202 may include a locator table 208 received or retrieved 212 from the metadata server 210. The locator table 208 may be stored in memory of the client 202 or remote memory that is accessible by the client 202. The locator table 208 includes entries for representations associated with tract identifiers and servers 102 associated with each representation. For example, each row in the locator table 208 may be one entry, including a representation and the servers 102 associated with that representation. The locator table 208 could then include a column for representations and a column for servers 102. Each representation may be a bit pattern of a determined bit length (such as a length of four). The number of representations and thus the number of entries is a function of that bit length, with one representation for each possible bit pattern. Thus, if the bit length of each representation is four, there will be sixteen representations and sixteen entries in the locator table 208. In one embodiment, the locator table 208 includes additional entries that are specific to tracts where the representations are the full translations of the tract identifiers. Such additional entries may be included for frequently accessed tracts or metadata of frequently accessed byte sequences. Further details regarding the locator table 208 are included in the following description, and an example locator table 208 is illustrated in FIG. 3 and is described with reference to that figure. In other implementations, rather than receiving or retrieving the locator table 208, the client 202 requests identifications of tract servers associated with tract identifiers from the metadata server 210. The metadata server 210 then consults the locator table 208 and answers the client 202 request. In such implementations, the client 202 need not have the locator table 208.

In various implementations, the client library 214 is a component configured to be utilized by other processes, threads, or routines, such as a dynamic link library. The client library 214 may be utilized by a file system interface, by an application, or by the OS of the computing device implementing the client 202, as mentioned above. The client library 214 provides interfaces, such as application programming interfaces (APIs), and performs actions based on requests received at those interfaces. When the client library 214 receives a request associated with a byte sequence, such as a request to create, delete, read from, or write to a byte sequence, the client library 214 identifies the server(s) 102 to direct the request 204 to, sends the request 204, and listens for the response.

In some implementations, the client library 214 is configured to request the locator table 208 from the metadata server 210. The client library 214 may receive/retrieve 212 the locator table 208 periodically or in response to an event. Such an event could be the receipt from the OS, an application, or the file system interface of a request associated with a byte sequence, the receipt of a response 206 indicating that the locator table 208 used by the client 202 is out of date, or the generation of an updated locator table 208 by the metadata server 210. The client library 214 may provide a version identifier of the locator table 208 already stored at the client 202 when requesting an updated locator table 208 from the metadata server 210. In response to such a request, the client library 214 either receives an updated locator table 208 or a response indicating that the client 202 already possesses the most up-to-date version of the locator table 208. The client library 214 may then store the updated locator table 208.

In some implementations, the client library 214 is also configured to generate byte sequence identifiers. The client library 214 may generate such a byte sequence identifier in response to the creation of a new byte sequence by the OS, an application, or the file system interface of the client 202. The client library 214 may generate the identifier by determining a random bit sequence of a certain length, such as a one-hundred-twenty-eight bit length. The use of the locator table 208 to direct a create request for the new byte sequence would then ensure that the generated byte sequence identifier is a GUID that is not already used to identify another byte sequence in the system. The locator table 208 requires that metadata of any byte sequence having the generated byte sequence identifier as its identifier be stored on a same server 102. If that server 102, when receiving a create request specifying the byte sequence identifier has no metadata stored for the identified byte sequence, then the generated byte sequence identifier is a GUID and the create request succeeds. If metadata is already stored, however, then the server 102 responds to the create request with an indication of failure. Responsive to receipt of that indication of failure, the client library 214 may generate a new random bit sequence as the byte sequence identifier and repeat the create request with the new byte sequence identifier.

In other implementations, the client library 214 may utilize other techniques to generate a byte sequence identifier as a GUID or may instead transmit a request to the metadata server 210 for the metadata server 210 to generate a byte sequence identifier. The client library 214 may then receive the byte sequence identifier from the metadata server 210 in response.

As mentioned above, the client library 214 receives requests associated with byte sequences from the OS, an application, or the file system interface of the client 202. Upon receiving the request, the client library 214 determines the type of the request and retrieves the byte sequence identifier from the request. If the request is a create request and no byte sequence identifier has yet been created, the client library 214 generates or requests generation of the byte sequence identifier, as described above. The client library 214 then determines a tract identifier associated with the metadata of the byte sequence that is the subject of the request. The tract identifier associated with the metadata comprises the byte sequence identifier and a specific, reserved tract sequence number, such as the number identifying the last available tract in the byte sequence. In some implementations, this specific reserved tract sequence number may be used for all byte sequences to generate the tract identifiers associated with the metadata of those byte sequences.

The client library 214 then calculates a translation of the tract identifier for the byte sequence metadata to a fixed length. In some embodiments, the calculating makes use of a hash algorithm, such as a SHA-1 hash algorithm, in translating the tract identifier. As mentioned above, the byte sequence identifier portion of each tract identifier may be one-hundred-twenty-eight bits and the tract sequence number may be sixty-four bits, combining to form a one-hundred-ninety-two bit tract identifier. Each hash or translation of a tract identifier may be a shorter length, such as one-hundred-sixty bits. One result of the calculation is that the translations for two very similar tract identifiers are very different from one another. While the first one-hundred-twenty-eight bits of two sequential tract identifiers are the same, the first two, three, or four bits of the translations of those tract identifiers are likely to be different from one another.

In various implementations, the client library 214 looks up the translation by comparing the translation to representations stored in the locator table 208, such as the representations in column 302 of FIG. 3. Because the representations may have a smaller bit length than the translation, the client library 214 may determine the length of the representations and determine the first N bits of the translation, N being the determined length of the representations. These first N bits are referred to herein as a "prefix" that is included in the translation. The client library 214 looks up this prefix in the locator table 208 and notes the servers 102 associated with each prefix. For example, servers A, B, and C may be associated with the prefix. The client library 214 may then randomly select one of these servers 102 as the server 102 associated with the metadata and the others as the replicas or may automatically select the first listed server 102 as the server 102 associated with the metadata and the others as the replicas.

Upon identifying the server 102 associated with the metadata and its replicas, the client library 214 forms a request 204 for transmission to the identified server 102. If the request received from the OS, application, or file system interface was a create or delete request, then the client library 214 will form request 204 as a create or delete request. If the request received from the OS, application, or file system interface was a write request, then the client library 214 will form request 204 as an extend request for allocation of tracts of the byte sequence that can be written to. If the request received from the OS, application, or file system interface was a read request, then the client library 214 will form request 204 as a request for a size of the byte sequence in order to learn how many tracts need to be retrieved to read the byte sequence. The request 204 may be any sort of message and may include such information as the byte sequence identifier, identifications of the replicas (e.g., Internet Protocol (IP) addresses), and an indication of the action requested (e.g., create, extend, delete, return size, etc.). The client library 214 may also retrieve the version identifier of the locator table 208 used by the client library 214 and include that version identifier in the request 204 to enable the server 102 to determine whether the client library 214 utilized an up-to-date version of the locator table 208. In some embodiments, the transmission of request 204 may include encapsulating the request 204 in a packet, such as a TCP/IP packet or a UDP packet, and transmitting the request 204 across a network.

In various implementations, the client library 214 listens for and receives the response 206 to the request 204. The response 206 indicates success or failure of the request 204. If the request 204 was a create or delete request and the response indicates success, the client library 214 notifies the OS, application, or file system interface that requested the creation or deletion of the byte sequence of the success of that operation. If the request 204 was a create request and the response indicates failure, the client library 214 may generate another byte sequence identifier in the manner described above and repeat the above-discussed client library 214 operations with that new byte sequence identifier. In the alternative, the client library 214 may notify the OS, application, or file system interface that requested the creation of the byte sequence of the failure of that operation. If the request 204 was a delete request and the response indicates failure, the client library 214 notifies the OS, application, or file system interface that requested the deletion of the byte sequence of the failure of that operation.

In some implementations, if the request 204 was an extend request, then response 206 may also include an identification of the tract or tracts allocated to the client 202. The identification may be in the form of tract sequence numbers referring to locations within the byte sequence, may be tract identifiers generated for those tracts, or may be a size of the byte sequence. If the size of a byte sequence was received, then the client library 214 may calculate the tract sequence numbers from the byte sequence size and proceed as if tract sequence numbers were received. If tract sequence numbers were received, then the client library 214 generates tract identifiers for the allocated tracts based on the byte sequence identifier and tract sequence numbers in the manner described above. Once the tract identifiers for the allocated tracts have been received or generated, the client library 214 generates fixed length translations of the tract identifiers and looks up those translations in the locator table 208, in the manner described above. Looking up the translations in the locator table 208 will likely result in a plurality of servers 102 being identified for the multiple allocated tracts. The client library 214 may then perform the write requested by the OS, application, or file system interface to the identified servers 102 that are to store data for the allocated tracts. Because multiple servers 102 may be identified as storing the multiple tracts, the client library 214 may write to the multiple servers 102 in parallel.

In various implementations, if request 204 was a request for a size of the byte sequence, then response 206 may indicate that size. The client library 214 may then utilize the size of the byte sequence and the uniform tract size to calculate the number of tracts in the byte sequence. For each sequence number in the number of tracts (e.g., tract sequence numbers 1, 2, 3, . . . N, with N being the number of tracts in the byte sequence), the client library 214 generates a tract identifier based on the byte sequence identifier and that tract sequence number, in the manner described above. Once the tract identifiers for the byte sequence have been generated, the client library 214 generates fixed length translations of the tract identifiers and looks up those translations in the locator table 208, in the manner described above. Looking up the translations in the locator table 208 will likely result in a plurality of servers 102 being identified for the tracts of the byte sequence. The client library 214 may then perform the read operation requested by the OS, application, or file system interface by requesting the tracts of the byte sequence from the identified servers 102 that store data for those tracts. Because multiple servers 102 may be identified as storing the multiple tracts, the client library 214 may read from the multiple servers 102 in parallel. The client library 214 then provides the tracts of data belonging to the byte sequence to the OS, application, or file system interface that requested the reading of the byte sequence.

In some implementations, a response 206 indicating failure may also specify a reason for the failure, such as indicating that the client library 214 is using an out-of-date locator table 208. If this reason is provided, then the client library 214 may request an updated locator table 208 from the metadata server 210 and repeat the above described operations using the updated locator table 208.

As mentioned above, the metadata server 210 generates and updates the locator table 208. In some embodiments, generating the locator table 208 includes selecting a bit length of the representation. The metadata server 210 performs this selecting based at least in part on the number of servers 102. For example, if there are eight servers 102, the metadata server 210 could select a bit length of three. After selecting the length, the metadata server 210 generates a locator table 208 with an entry for each possible representation, associating multiple servers 102 with each possible representation as replicas to ensure redundancy. To calculate the number of representations, the metadata server 210 may utilize the function $2^N$, where N is the bit length of the representation set by the metadata server 210. For example, if the bit length is three, the metadata server 210 will determine that eight representations should be included in the locator table 208 and that those representations will be 000, 001, 010, 011, 100, 101, 110, and 111. Along with generating the representations of the locator table 208, the metadata server 210 associates and apportions the servers 102 in some manner to the representations. For example, the metadata server 210 may determine that three servers 102 should be associated with each representation, and servers A-Z are available for assignment. The metadata server 210 may then associate servers A, B, and C with a first representation, servers D, E, and F with a second representation, and so on. Once each server 102 has been associated with a representation, the metadata server 210 may "cycle" through the servers 102 again, associating each server 102 to a second representation. In some embodiments, the associating effects a distribution of the tracts among the servers 102 by associating different representations with different servers 102. As mentioned above, each representation corresponds to a prefix included in a translation of a tract identifier. The translating is performed in such a manner that sequential tracts of a byte sequence have different prefixes. Thus, by associating the different prefixes of tracts of a byte sequence to different servers 102, the metadata server 210 ensures that the tracts of a given byte sequence are distributed among a plurality of servers 102.

In some embodiments, the metadata server 210 ascertains or is programmed with the knowledge that one of the tracts stored by one of the servers 102 is frequently accessed. The metadata server 210 adds an entry to the locator table 208 for that tract, including as the representation the full translation of the tract's identifier. In one embodiment, that frequently accessed tract may store the metadata of a frequently accessed byte sequence. The locator table 208 accommodates the inclusion of new tracts without requiring a refresh or update of the locator table 208. Because, as mentioned above, the locator table 208 includes all possible representations, there is no need for the metadata server 210 to update the locator table 208 in response to the creation of a new tract or new byte sequence, as that new tract or the metadata of that new byte sequence will correspond to one of those possible representations.

The metadata server 210 also may update the locator table 208 upon detecting the failure of a server 102, the addition of a new server 102, or to re-balance the load between the servers 102. The generated or updated locator table 208 is then provided to or retrieved 212 by the clients 202 and, in some embodiments, provided to the servers 102. The locator table 208 can be transmitted in any format recognizable by the clients 202 and servers 102. For example, the locator table 208 may be represented as a data structure, a text file, an extensible markup language (XML) file, or a database file, such as a Microsoft Access® database file. The clients 202 may each be registered with the metadata server 210, thereby informing the metadata server 210 of their identities. In other embodiments, the metadata server 210 retrieves a list of clients 202 from another server or computing device. In yet other embodiments, the metadata server 210 only provides the locator table 208 to clients 202 in response to requests 212 from the clients 202 for the locator table 208. In the requests, the clients 202 may indicate the version identifiers of locator tables 208 stored on those clients 202. If the current version identifier shows that the locator table 208 has since been updated, the metadata server 210 provides the locator table 208 in response to the requests. If the clients 202 already have the current locator table 208, then the metadata server 210 simply indicates to the clients 202 that their locator tables 208 are current.

As illustrated in FIG. 2, the metadata server 210 stores the locator table 208 after generating or updating the locator table 208. For example, the metadata server 210 may store the locator table 208 in DRAM. By storing the locator table 208, the metadata server 210 is enabled to provide the locator table 208 to requesting clients 202.

In various implementations, as mentioned above, the metadata server 210 also generates a byte sequence identifier upon request from the client library 214. The metadata server 210 may generate the byte sequence identifier by selecting a fixed length bit sequence at random and repeating the generation if that fixed length bit sequence is already used as a byte sequence identifier. Discovery that a fixed length bit sequence is already used may be made in a trial and error fashion, as described above with regard to client library 214. Alternatively, the metadata server 210 may maintain and reference a list or other indicator of byte sequence identifiers already in use and generate a fixed length bit sequence that is not in use as a byte sequence identifier based on the list or indicator. The metadata server 210 then provides the byte sequence identifier to the client 202 and updates any list or indicator.

In various implementations, servers 102 includes a plurality of servers 102, such as server 102a, server 102b, and server 102c, which are described above with reference to FIG. 1. While both FIGS. 1 and 2 show servers 102 including three servers 102, it is to be understood that servers 102 may comprise any number of servers. As previously mentioned, servers 102 may be associated with storage nodes of a datacenter, storing data of the data center and enabling reading and writing of that data. As shown in FIG. 2, these servers 102 may each include a serial processing module (216a, 216b, 216c) to handle the serial processing of requests 204 requiring coordination between multiple clients 202 and a storage unit memory 218, the storage unit memory 218 storing byte sequence metadata 220 and tracts 222 of multiple byte sequences. Thus, server 102a includes serial processing module 216a and storage unit memory 218a which stores metadata 220a and tracts 222a. Server 102b includes serial processing module 216b and storage unit memory 218b which stores metadata 220b and tracts 222b. Server 102c includes serial processing module 216c and storage unit memory 218c which stores metadata 220c and tracts 222c. In some implementations, each server 102 also includes an OS, applications, module(s) enabling read and write operations, and a routing module that directs received requests to the serial processing module 216, to module(s) enabling read and write operations, or to another destination.

In various implementations, the storage unit memory 218 could be any sort of storage component, such as a disk drive, a permanent storage drive, random access memory, an electrically erasable programmable read-only memory, a Flash Memory, a miniature hard drive, a memory card, a compact disc (CD), a digital versatile disk (DVD), an optical storage drive, a magnetic cassette, a magnetic tape, or a magnetic disk storage.

In some implementations, the metadata 220 stored by the storage unit memory 218 is stored in tract-size increments, with the metadata 220 for each byte sequence having its own tract-size area of the storage unit memory 218. For example, if the storage unit memory 218 stores metadata 220 for two byte sequences—byte sequences 1 and 5—the storage unit memory 218 will include two tract-size areas to store the metadata 220, one for each byte sequence. In other implementations, metadata 220 for each byte sequence is allocated a fixed-size area of the storage unit memory 218, the fixed-size being different from the size of a tract 222. In yet other implementations, the storage unit memory 218 reserves an area for all of the metadata 220 of all the byte sequences and does not allocate a fixed-size area to metadata 220 of each individual byte sequence.

The metadata 220 may store a number of pieces of information about its associated byte sequence. For instance, the metadata 220 for a byte sequence may store a flag indicating that the byte sequence has been created, a byte sequence identifier, and a size of the byte sequence, which may be measured in some unit of bytes (e.g., megabytes, gigabytes, terabytes, etc.) or in the number of tracts allocated (e.g., 10 tracts corresponding to tract sequence numbers 1-10). The metadata 220 may also include other information useful in serially processing requests 204 that require coordination between multiple clients 202.

In various implementations, the tracts 222 represent tract-size areas of the storage unit memory 218 allocated to tracts of data from multiple byte sequences. Since tracts 222 have a fixed size (e.g., eight megabytes), each tract 222 is allocated a same-sized area of the storage unit memory 218 that corresponds to the tract size. In some implementations, a part of the storage area allocated to each tract 222 stores a tract identifier. The stored tract identifier may be the full identifier of that tract 222 or a hash or other fixed length translation of the tract identifier that possesses a smaller size. In some implementations, the tracts 222 may be stored contiguously, but they may also be stored in another manner. The tracts 222 may include tracts 222 from multiple byte sequences, including byte sequences that have their metadata 220 stored on another server 102. As described above, the tracts 222 stored on any given server 102 are determined with reference to the locator table 208, which affects a distribution of the tracts 222 among the servers 102 such that the tracts 222 of a given byte sequence are likely to be stored on many different servers. For example, if server 102a stores metadata 220a for byte sequence 1, it may store tracts 222a for byte sequences 2, 6, and 8. In other words the selection of tracts 222 stored on a server 102 is independent of the byte sequence metadata 220 stored on that server 102.

In some implementations, the storage unit memory 218 may also store a version identifier associated with the locator table 208 to enable each server 102 to track updates of the locator table 208 and ensure that the requesting clients 202 are using up-to-date versions of the locator table 208. This in turn assures that servers 102 only store byte sequence metadata 220 that they are supposed to store.

In various implementations, the serial processing module 216, module(s) enabling reading or writing operations, and routing module of each server 102 may include processes, threads, or routines and may be stored in the storage unit memory 218 or in additional memory, such as cache memory or RAM, of the computing device implementing the server 102.

In some implementations, each server 102 utilizes a routing module to direct received requests, which may include requests 204 requiring serial processing and other requests. The routing module directs the requests based on a request type specified in each request (e.g., in a header field of the request). If the request is a request 204 requiring serial processing, such as a create request, an extend request, or a delete request, the routing module directs the request 204 to the serial processing module 216. If the request is instead a request for the size of a byte sequence, a read request, or a write request, then the routing module directs the request to the module(s) enabling read or write operations or to some other module(s).

In various implementations, upon receiving the requests 204 from the routing module, the serial processing module 216 enqueues or otherwise orders the requests 204 such that the requests 204 are processed in some sequence, one after another. One technique for ordering the requests 204 is for the serial processing module 216 to process the requests 204 in the order they are received. Such a technique may utilize a first-in-first-out (FIFO) queue to ensure that the requests 204 are processed in the order they are received. In other implementations, the serial processing module 216 may utilize alternative schemes for ordering the requests 204, such as giving priority to certain clients 202 or certain request types (e.g., execute all create requests before executing requests of any other kind). Regardless of the ordering scheme utilized, the serial processing module 216 processes the requests 204 serially to achieve the required coordination between the clients 202. Thus, if two clients 202 request 204 the creation of the same byte sequence, one of these requests must be processed before the other, preventing the creation of conflicting byte sequences.

When processing a request 204, the serial processing module 216 first compares the version identifier specified in the requests 204 to the version identifier known to the server 102, which, as mentioned above, may be stored in the storage unit memory 218. The serial processing module 216 performs this comparison to ensure that the requesting client 202 used up-to-date system metadata (e.g., an up-to-date locator table 208) in identifying the server 102. If the comparison indicates that the version used by the client 202 is newer than the version known to the server 102, then the serial processing module 216 updates the known version identifier stored in the storage unit memory 218 based on the version identifier specified in the request 204. If the comparison indicates that the version used by the client 202 is older than the version known to the server 102, then the serial processing module 216 transmits failure notification to the client 202 in response 206 to the request 204 and forgoes any further processing of that request 204.

In various implementations, the serial processing module 216 then serially processes the request 204 by performing a two-phase commit. In the two-phase commit, the serial processing module 216 determines the replicas of the server 102 by accessing identifications of those replicas that are specified in the request 204. For example, the request 204 may identify the replicas in a header field of the request 204. Upon determining the replicas, the serial processing module 216 provides those replicas with proposal to change to the byte sequence associated with the request 204. For instance, the serial processing module 216 may propose the creation of the byte sequence in response to receiving a create request 204. Those replicas and the server 102 then transmit their approval of the proposed change to each other. If one or more of the server 102 and replicas does not approve the proposed change (e.g., because metadata of replica indicates that the byte sequence was already created), then the serial processing module 216 responses 206 to the request 204, notifying the client 202 of the failure of the request 204.

If the server 102 and replicas all approve the proposal, then, upon receiving the approvals, the serial processing module 216 of each of the server 102 and its replicas commits the change by performing the action sought by the request 204. Performance of the action by the serial processing module 216 of each of the server 102 and its replicas involves those serial processing modules 216 updating the metadata 220 that is stored in the storage unit memory 218 to reflect the change. Continuing with the example of the create request, the serial processing modules 216 allocate memory for metadata 220 associated with the byte sequence identifier specified in the create request 204 and store the byte sequence identifier and a flag indicating creation of the byte sequence in that metadata 220. After performing the action, the serial processing modules 216 of the server 102 and the replicas indicate the success or failure of the performance to each other.

At the conclusion of the two-phase commit, the serial processing module 216 of the server 102 responds to the client 202, indicating success or failure of the request 204. The two-phase commit can also fail for a number of reasons. For example, one of the server 102 or its replicas may fail while performing the two-phase commit. In another example, one of the replicas may have been misidentified. In such a case, the replica may respond in the negative to the proposed change, as the replica may be unaware of the byte sequence for which, e.g., an extend is sought.

In various implementations, the serial processing module 216 may also perform a number of operations that are specific to the type of the request 204 as part of the serial processing of the request 204. In some implementations, the request 204 is a create request 204 for a byte sequence (e.g., a request 204 to create byte sequence 2 that is received by server 102b). In processing the request 204, the serial processing module 216 determines if metadata 220 associated with a byte sequence identifier specified in the request 204 is stored on the storage unit memory 218 of the server 102. If such metadata 220 exists, then the serial processing module 216 responds 206 to the request 204 with an indication of failure, as the byte sequence specified in the request 204 has already been created. As described above, if no such metadata 220 exists, than serial processing module 216 allocates memory for the metadata, and stores both the byte sequence identifier and, optionally, a flag indicating the existence of the byte sequence in the allocated memory. If two create requests 204 for the same byte sequence are received at the same time, then, the serial processing of the requests 204 by the serial processing module 216 will guaranty that at least one of these requests 204 fails.

In various implementations, the request 204 is an extend request 204 asking the serial processing module 216 to allocate a number of tracts of a byte sequence to the client 202. The number of tracts allocated to the client 202 may be a default number allocated responsive to requests 204 or may be a number specified in the request 204. In some implementations, the serial processing module 216 allocates a large number of tracts in response to an extend request 204 to reduce the overall number and frequency of extend requests 204. The allocated tracts of the byte sequence then belong to the client 202 and are the client's 202 to write data to. It should be noted that the act of allocating tracts does not actually allocate physical memory to store those tracts. Rather, it allocates locations in a byte sequence that are identifiable by tract identifiers. The client 202 must then locate the servers 102 that are to store these allocated tracts and write the tracts to those servers 102. To allocate the tracts, the serial processing module 216 checks the metadata 220 of the byte sequence corresponding to the byte sequence identifier specified in the extend request 204 to determine a current size or last allocated tract sequence number of the byte sequence. The serial processing module 216 then updates the metadata 220 to reflect the new size or new last allocated tract sequence number following performance of the extend request 204 and responds 206 to the client 202 with a message notifying the client 202 of the new, allocated tracts. The message may include the tract sequence numbers of the allocated tracts or may include tract identifiers generated by the serial processing module 216 based on the tract sequence numbers and byte sequence identifier. In one implementation, if the byte sequence has a maximum size specified in the metadata 220 and the current size or last allocated tract sequence number indicates that the maximum has been reached, the serial processing module 216 responds 206 to the client 202 with a notification that the extend request 204 has failed.

In some implementations, the serial processing module 216 gathers extend requests 204 and, when a certain number of extend requests 204 are gathered, processes those requests 204 as a single extend request. For example, if the serial processing module 216 receives three extend requests 204 each for three tracts, the serial processing module 216 processes those requests 204 as a single extend request 204 for nine tracts. In implementations involving two-phase commits for each processed request 204, this gathering of extend requests 204 would reduce the number of two-phase commits that must be performed from three to one. Also, by performing a single extend, the serial processing module 216 need only update the metadata 220 once to reflect the addition of the new tract allocations. The serial processing module 216 then responds 206 to the requests 204 as if they were processed individually, informing each requesting client 202 only of the three tracts allocated to that client 202.

In various implementations, the request 204 is a delete request 204 for deleting a byte sequence. In processing the request 204, the serial processing module 216 determines if metadata 220 associated with the byte sequence identifier specified in the request 204 is stored on the storage unit memory 218 of the server 102. If no such metadata 220 exists, then the serial processing module 216 responds 206 to the request 204 with an indication of failure, as the byte sequence specified in the request 204 has already been deleted or was never created. If such metadata 220 exists, than the serial processing module 216 deletes the metadata 220 from the storage unit memory 218. If two delete requests 204 for the same byte sequence are received at the same time, then the serial processing of the requests 104 by the serial processing module 216 will guaranty that at least one of these requests fails.

It will be understood that the specific operations described above for create, extend, and delete requests 204 may all be performed in the context of the two-phase commit process described above, or may be serially processed in another manner.

In various implementations, as described above, the serial processing module 216 completes its operations for a request 204 by responding 206 to the request 204 and indicating at least the success or failure of the request 204. As mentioned, if the request 204 is an extend request 204, the response 206 may specify the allocated tracts. If the response 206 indicates that the request 204 failed, the response 206 may indicate the reason for the failure, such as "out-of-date locator table."

Also, as mentioned above, the server 102 may include module(s) that enable read or write operations. These module(s) may be part of serial processing module 216 or may be a separate module or modules. These module(s) may receive read or write requests from the routing module and may process the read or write requests independently of the serial processing performed by the serial processing module 216, as the read and write requests do not require coordination between multiple clients 202. Any client 202 making a write request has the tracts allocated specifically to that client 202, and read requests can be processed for multiple clients 202 simultaneously. Thus, these read and write requests may be processed concurrently with the operations of the serial processing module 216 and independently of those operations. These read or write requests may be associated with a plurality of tracts 222 of a plurality of byte sequences that may be different from the byte sequences for which each server 102 is serially processing requests 204. Processing of read or write requests may involve writing a tract or tracts 222 to storage unit memory 218 or retrieving a tract or tracts 222 from the storage unit memory 218. If the request fails, either because there is not available memory to perform the write or the requested tract(s) do not exist and therefore cannot be read, the module(s) enabling the read or write operations respond to the client 202 with an indication of failure. If the request succeeds, then the module(s) enabling the read or write operations respond to the client 202 with an indication of success. Further details of reading and writing operations may be found in application Ser. No. 12/763,107, entitled "Locator Table and Client Library for Datacenters" and filed on Apr. 19, 2010, and in application Ser. No. 12/763,133, entitled "Memory Management and Recovery for Datacenters" and filed on Apr. 19, 2010.

In various implementations, as mentioned above, the server 102 may receive a request from a client 202 for the size of a byte sequence. Such a request may be processed by the serial processing module 216, by the module(s) enabling read or write operations, or by another module. Regardless of what module processes the request, that module looks up the metadata 220 associated with the byte sequence identifier specified in the request to determine the current size or last allocated tract sequence number. The module then responds to the request by providing the current size or last allocated tract sequence number to the client 202, enabling the client 202 to, for example, formulate read request(s). If metadata 220 corresponding to the byte sequence identifier is not found, then the module response with an indication of failure.

Example Locator Table

FIG. 3 illustrates a block diagram showing an example locator table, in accordance with various embodiments. As illustrated, a locator table 208 includes a column 302 for representations and a column 304 for servers 102. Each row of the locator table 208 includes a representation and multiple servers 102 associated with that representation. Each representation in column 302 is a bit pattern with a length of four, with the exception of the last representation shown in column 302. The last representation is a full translation of a tract identifier. While shown as eight bits, the representation may be one-hundred-sixty bits. The full translation may be used in association with "heavily utilized" tracts (e.g., tracts that are frequently read from) or with metadata of "heavily utilized" byte sequences. As mentioned above, column 302 includes every possible bit pattern with a length of four. The servers 102 in column 304 comprise server identifiers, such as Internet Protocol (IP) addresses of each server 102. Thus, in the first row of column 304, the servers "A, B, C" correspond to three server IP addresses. Each of those servers "A, B, C" are associated with tracts that are in turn associated with the representation "0000" via translations to fixed lengths of tract identifiers. Prefixes included in the translations also comprise bit patterns with a length of four bits and are matched to the representations in the locator table 208.

In various embodiments, the locator table 208 also includes a locator table version identifier 306, such as a sixty-four bit number. Each time a new locator table 208 is generated or updated, the metadata server 210 increments the version identifier 306 and stores the incremented version identifier 306 in the new locator table 208. As described in detail above, the version identifier 306 enables clients 202 receiving a new locator table 208 to determine whether they have the most recent locator table 208 and enables servers 102 to track the most recent version of the locator table 208. The version identifier 306 also enables the metadata server 210 to determine whether a requesting client 202 has the most recent locator table 208, as such requests include the version identifier of the locator table 208 stored on the client 202.

Example Operations

Figure 4:
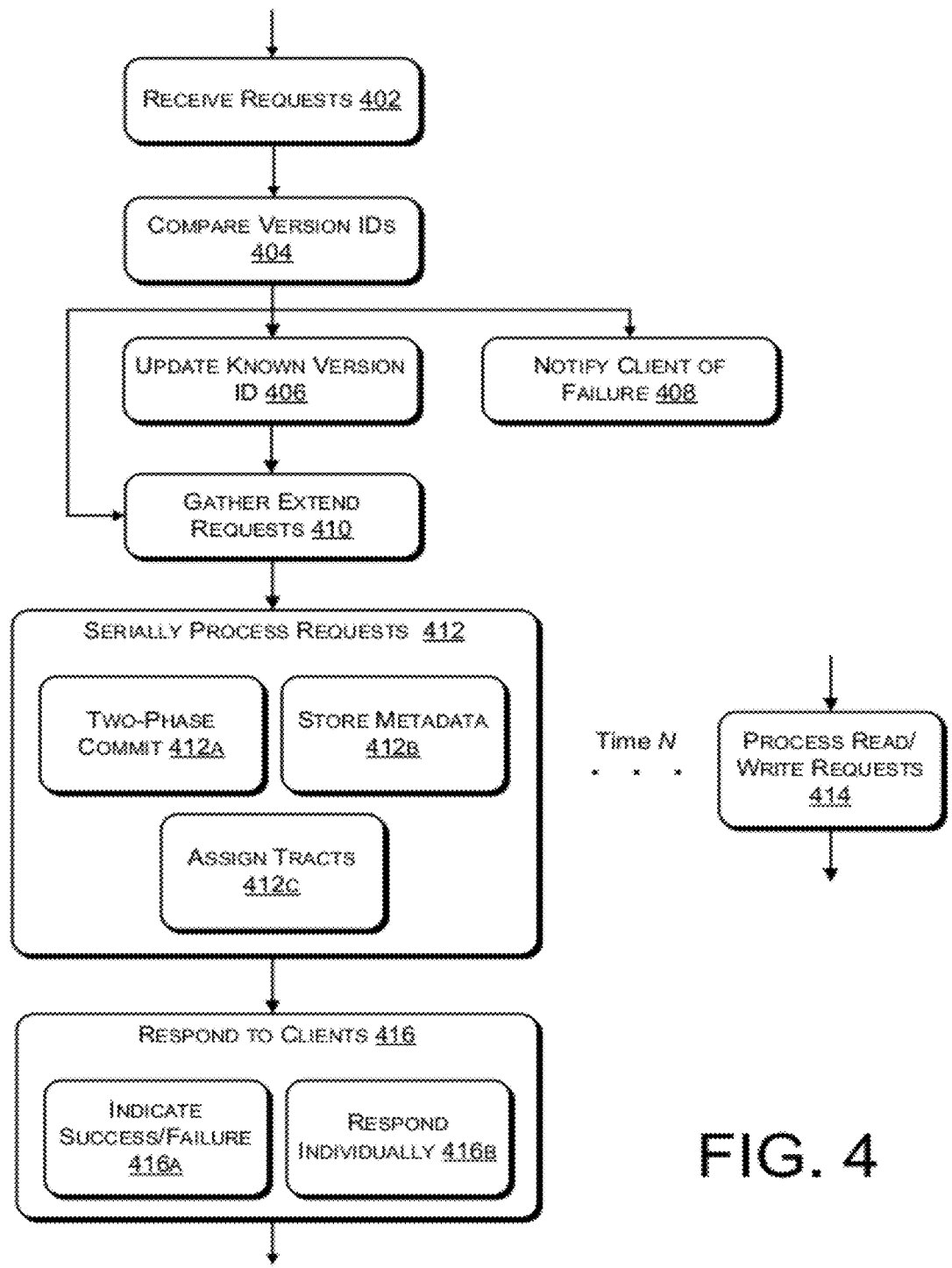
FIG. 4 illustrates a flowchart showing example operations for multiple servers operating in parallel to serially process requests, in accordance with various embodiments.

FIG. 4 illustrates a flowchart showing example operations for multiple servers operating in parallel to serially process requests, in accordance with various embodiments. As illustrated at block 402, a plurality of servers, such as servers 102, receive a plurality of requests associated with a plurality of byte sequences, the requests for each byte sequence being received by a single one of the servers. In some implementations, the servers are tract servers, each storing a plurality of tracts of data associated with multiple byte sequences, the multiple byte sequences each being comprised of multiple tracts of data. Further, the requests are for operations that require coordination between multiple clients. In some implementations, the requests include at least one of create requests for creating byte sequences, extend requests for extending byte sequences, or delete requests for deleting byte sequences.

At block 404, each server compares a version identifier included in one of the requests with a version identifier known to the server, the version identifiers being associated with a locator table, such as locator table 208. At block 406, when the version identifier in the request indicates a more recent version than the version identifier known to the server, the server updates the version identifier known to that server. At block 408, when the version identifier known to the server indicates a more recent version than the version identifier in the request, the server notifies a client that sent the request, such as a client 202, that the request has failed.

At block 410, when the requests received by one of the servers include multiple extend requests for a byte sequence, that server gathers the extend requests for processing as a single extend request.

At block 412, the servers each serially process the requests that each receives but perform the serial processing in parallel with respect to each other. At block 412a, the serial processing includes performing a two-phase commit at each server and the replica servers of that server, the replica servers being identified in the requests. At block 412b, the serial processing comprises storing metadata for each byte sequence on the server processing the requests for that byte sequence. At block 412c, when the requests include an extend request, the serial processing comprises assigning a client that sent the extend request a plurality of tracts of data belonging to the byte sequence that is extended by the extend request. In some implementations, when one of the servers gathered extend requests at block 410 for processing as a single extend request, the serial processing comprises processing the gathered extend requests as a single extend request.

At block 414, in parallel with the serial processing, the servers process read requests or write requests.

At block 416, the servers respond to the client requests. At block 416a, the responding includes indicating the success or failure of the requests. For example, the responding may include notifying a client of the failure of the client's request when that request was a create request for a byte sequence that had already been created or a delete request for a byte sequence that had already been deleted. At block 416b, when one of the servers processed gathered extend requests at block 412 as a single extend request, that server responds to clients that sent the gathered extend requests as if the gathered extend requests were processed individually.

Figure 5:
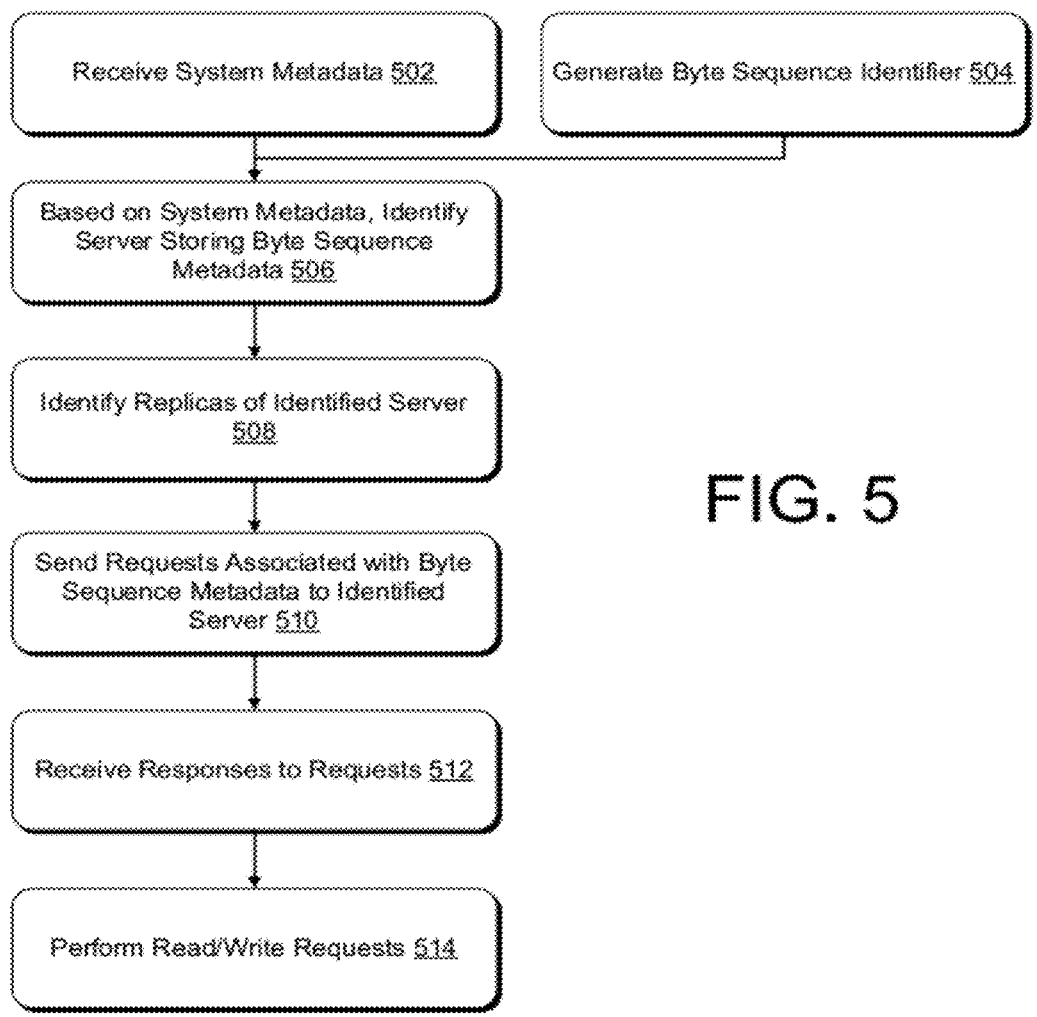
FIG. 5 illustrates a flowchart showing example operations for identifying, based on system metadata, a server associated with byte sequence metadata of a byte sequence and for sending requests associated with the byte sequence metadata to the identified server, in accordance with various embodiments.

FIG. 5 illustrates a flowchart showing example operations for a plurality of client devices to each independently identify, based on system metadata, a same server associated with byte sequence metadata of a same byte sequence and for sending requests associated with the byte sequence metadata to the identified server, in accordance with various embodiments. As illustrated at block 502, each of a plurality of client devices, such as client devices implementing client 202, receives system metadata that is associated with a plurality of servers, such as servers 102. In some implementations, the system metadata includes a locator table, such as locator table 208, associating servers with fixed length representations, each fixed length representation associated with one or more translations of one or more tract identifiers. In various implementations, the system metadata is received from another device, such as the metadata server 210. Also, the client devices may each receive the same system metadata.

At block 504, one of the client devices generates a byte sequence identifier that uniquely identifies a byte sequence.

At block 506, each client device independently identifies a same one of servers as storing metadata for a same byte sequence based at least in part on the system metadata. In some implementations, the identifying includes generating a tract identifier associated with the metadata of the byte sequence by appending a reserved offset value to a generated byte sequence identifier. Each client device then calculates a fixed length translation of the tract identifier associated with the metadata and identifies a server associated with that fixed length translation in the locator table. At block 508, each client device identifies replicas of the identified server. Identifying the replicas may also involve utilizing the locator table.

At block 510, the client devices send requests associated with the metadata of the same byte sequence to the same identified server. Those requests may include at least one of a size request to determine a size of the byte sequence, a create request for creating the byte sequence, an extend request for extending the byte sequence, or a delete request for deleting the byte sequence. In some implementations, the requests may include identifications of replicas of the server to which they are sent.

At block 512, the client devices receive responses to the requests. At block 514, the client devices performs read or write operations to a byte sequence, those read or write operations enabled by the sending at block 510 and the receiving at block 512.

Example Computer System

FIG. 6 illustrates a block diagram showing components of a computer system implementing a server 102, client 202, or metadata server 210, in accordance with various embodiments. In some implementations, computer system 600 may include at least one processing unit 602 and system memory 604. The processing unit may be any sort of processing unit. Depending on the configuration and type of computing device, system memory 604 may be volatile (such as RAM), non-volatile (such as ROM, flash memory, etc.) or some combination of the two. System memory 604 may include an operating system 606, one or more program modules 608, and may include program data 610.

Computer system 600 may also include additional data storage devices (removable and/or non-removable) such as, for example, magnetic disks, optical disks, or tape. Such additional storage is illustrated in FIG. 6 by removable storage 612 and non-removable storage 614. Removable storage 612 and non-removable storage 614 may represent the storage unit memory 218 if the computer system 600 implements a server 102. Computer-readable storage media may include volatile and nonvolatile, removable and non-removable media implemented in any method or technology for storage of information, such as computer readable instructions, data structures, program modules, or other data. System memory 604, removable storage 612 and non-removable storage 614 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computer system 600. Any such computer-readable storage media may be part of the computer system 600.

In various embodiment, any or all of system memory 604, removable storage 612, and non-removable storage 614, may store programming instructions which, when executed, implement some or all of the above-described operations of the servers 102, client 202, or metadata server 210. In some embodiments, the programming instructions include instructions implementing one or more of the client library 214 or the serial processing module 216.

Computer system 600 may also have input device(s) 616 such as a keyboard, a mouse, a touch-sensitive display, voice input device, etc. Output device(s) 618 such as a display, speakers, a printer, etc. may also be included. These devices are well known in the art and need not be discussed at length here.

Computer system 600 may also contain communication connections 620 that allow the device to communicate with other computing devices 622. The communication connections 620 are implemented at least partially by network interface components.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
providing, to multiple clients, shared metadata that associates individual byte sequences of a plurality of byte sequences with a single server of a plurality of servers;
after providing the shared metadata, receiving, by the plurality of servers, a plurality of requests associated with the plurality of byte sequences, wherein requests for individual byte sequences are received directly at the single server associated with the individual byte sequence from one or more of the multiple clients based on the shared metadata, and wherein the requests for individual byte sequences are for one or more operations that require coordination between the multiple clients; and
serially processing the plurality of requests at the plurality of servers, wherein the plurality of servers perform the processing in parallel with respect to each other.

2. The method of claim 1, wherein the requests for individual byte sequences include at least one of create requests for creating byte sequences, extend requests for extending byte sequences, or delete requests for deleting byte sequences.

3. The method of claim 2, further comprising gathering a plurality of extend requests for a byte sequence, processing the gathered extend requests as a single extend request, and responding to the multiple clients that sent the plurality of extend requests as if the plurality of extend requests were processed individually.

4. The method of claim 2, wherein the requests include the extend requests for extending byte sequences and processing an extend request comprises assigning a client that sent the extend request a plurality of tracts of data belonging to the byte sequence that is extended by the extend request.

5. The method of claim 1, wherein the requests for individual byte sequences identify one or more replica servers and the serially processing comprises performing a two-phase commit at the single one of the plurality of servers and the one or more replica servers of that server.

6. The method of claim 1, wherein metadata for individual byte sequences is stored on the single one of the plurality of servers processing the requests for that byte sequence.

7. The method of claim 1, further comprising, in response to determining that a request is a create request for a byte sequence that has already been created or a delete request for a byte sequence that has already been deleted, notifying a client that transmitted the create request or the delete request that the create request or the delete request has failed.

8. The method of claim 1, further comprising notifying the multiple clients that sent the requests of the success or failure of the requests.

9. The method of claim 1, further comprising:
comparing, by each server, a version identifier included in one of the requests with a version identifier known to the server, the version identifiers being associated with a locator table;
when the version identifier included in the one of the requests indicates a more recent version than the version identifier known to the server, updating the version identifier known to the server; and
when the version identifier known to the server indicates a more recent version than the version identifier included in the one of the requests, notifying a client that sent the request that the request has failed.

10. A system comprising:
a plurality of servers, wherein each server is pre-assigned to process direct requests for one or more byte sequences and each server includes a processor, a storage device, and logic configured to perform operations including:
receiving, directly from multiple clients, a plurality of requests associated with the one or more byte sequences to which the server is assigned, wherein the plurality of requests are for operations that require coordination between the multiple clients,
serially processing the plurality of requests, and
storing results of the plurality of requests in the storage device as metadata of the one or more byte sequences,
wherein the plurality of servers perform the serial processing in parallel with respect to each other.

11. The system of claim 10, wherein the plurality of servers are tract servers each storing a plurality of tracts of data associated with multiple byte sequences in the storage device of that server, the multiple byte sequences each being comprised of multiple tracts of data.

12. The system of claim 11, wherein the operations include processing read requests or write requests in parallel with the serially processed requests.

13. A method comprising:
receiving, by a server, a plurality of requests indicating one or more operations for a byte sequence based on metadata shared between multiple client devices, the metadata associating the byte sequence with the server before the server receives the plurality of requests; and
serially processing, by the server, the one or more operations for the byte sequence.

14. The method of claim 13, further comprising providing, to the multiple client devices, metadata for the byte sequence, wherein the metadata includes a locator table associating the server with fixed length representations, each fixed length representation associated with one or more translations of one or more tract identifiers for the byte sequence.

15. The method of claim 14, wherein the metadata for the byte sequence is associated with a tract identifier comprised of a byte sequence identifier and a reserved offset value.

16. The method of claim 13, wherein the plurality of requests include at least one of a size request to determine a size of the byte sequence, a create request for creating the byte sequence, an extend request for extending the byte sequence, or a delete request for deleting the byte sequence.

17. The method of claim 16, wherein each client device is enabled to perform read or write operations to the byte sequence by sending a request associated with the metadata of the byte sequence and by receiving a response to that request.

18. The method of claim 13, further comprising notifying the multiple client devices of a success or failure of the plurality of requests.

19. The method of claim 13, further comprising:
comparing, by the server, a version identifier included in a request with a version identifier known to the server, the version identifiers being associated with a locator table;

when the version identifier included in the request indicates a more recent version than the version identifier known to the server, updating the version identifier known to the server; and when the version identifier known to the server indicates a more recent version than the version identifier included in the request, notifying a client device that sent the request that the request has failed.

20. The method of claim 13, wherein the plurality of requests include at least one of create requests for creating the byte sequence, extend requests for extending the byte sequence, or delete requests for deleting the byte sequence.

* * * * *